United States Patent Office 2,724,660
Patented Nov. 22, 1955

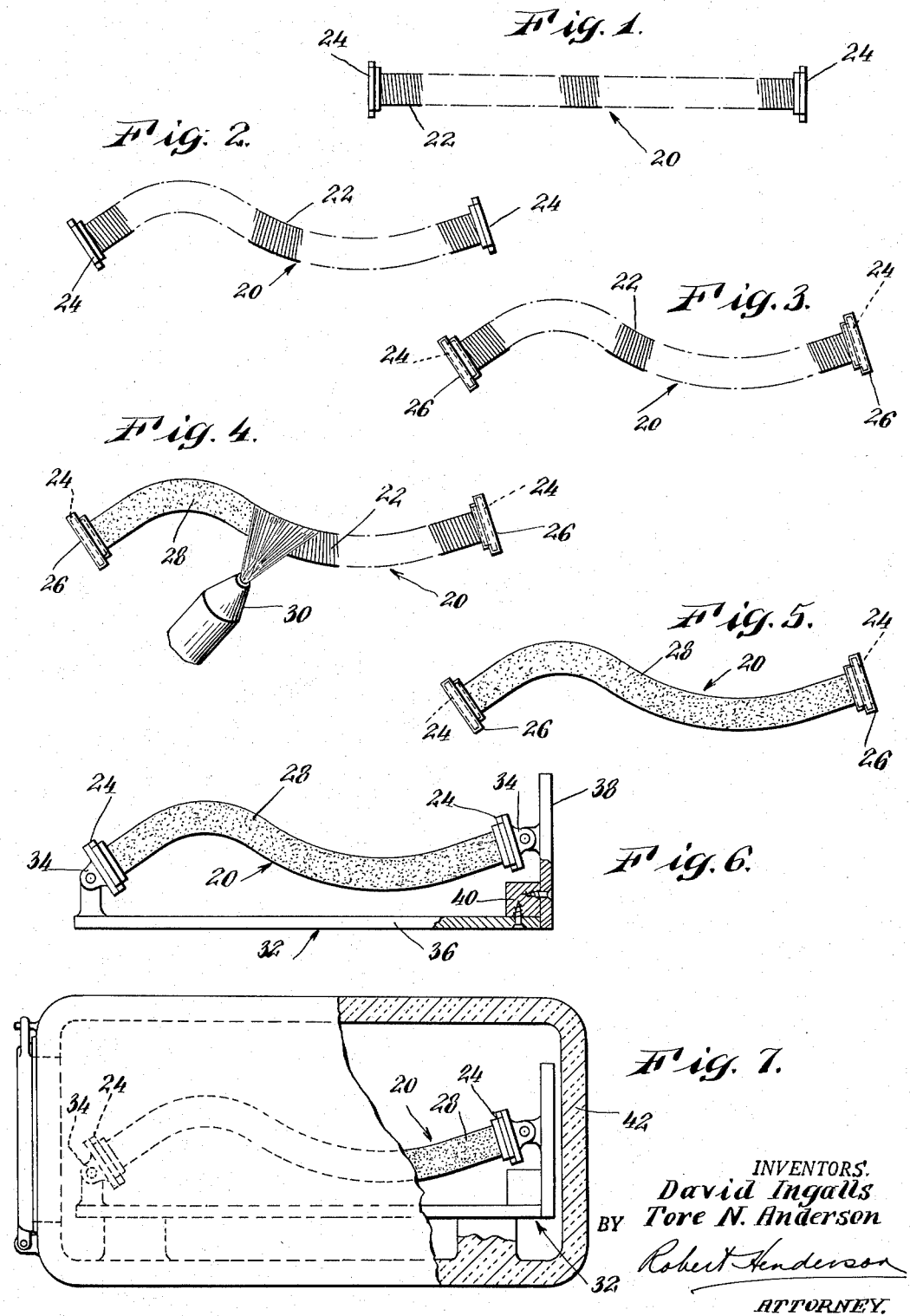

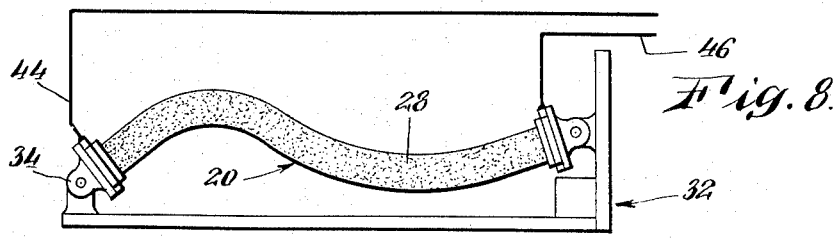
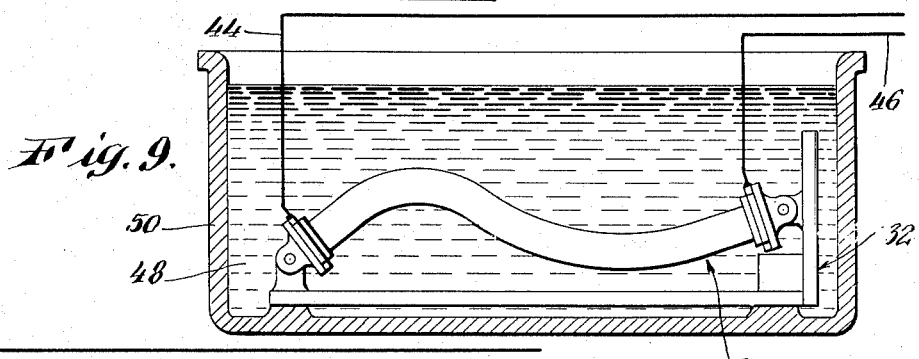
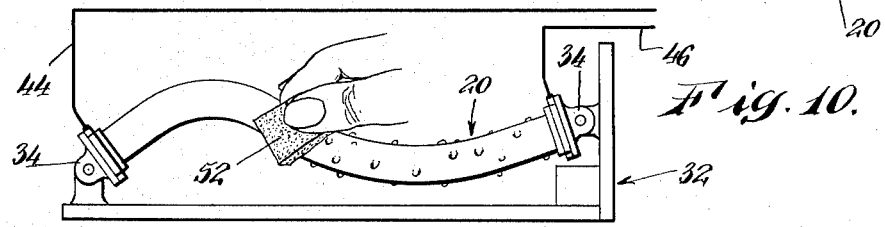
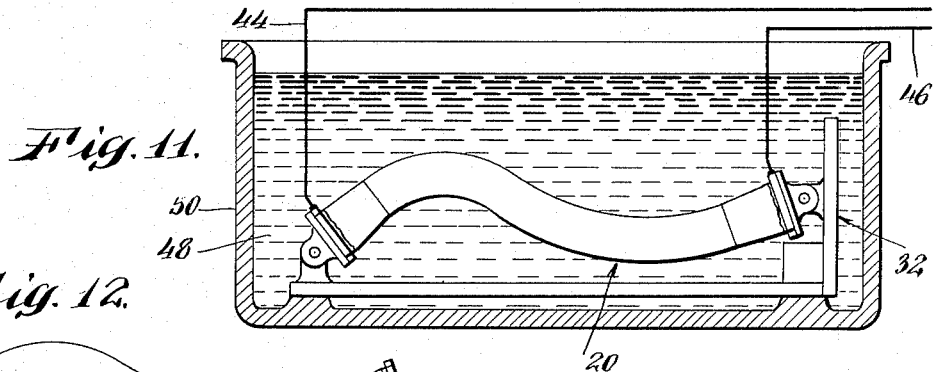
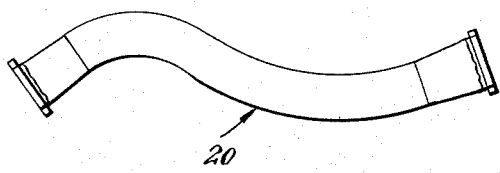
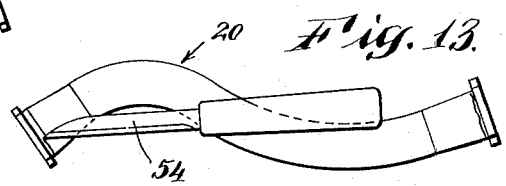
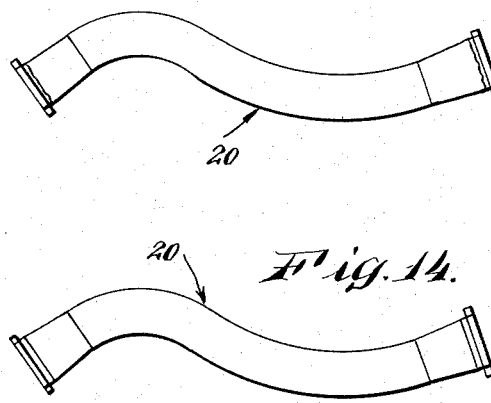

2,724,660

METHOD OF APPLYING PROTECTIVE JACKETING TO FLEXIBLE METAL TUBES

David Ingalls and Tore N. Anderson, Mountainside, N. J., assignors to Airtron, Inc., Linden, N. J., a corporation of New Jersey Application October 24, 1951, Serial No. 252,947

2 Claims. (Cl. 117—75)

The present invention relates to an improved method of applying protective jacketing to flexible metal tubes, and although it may be employed with respect to various types of metal tubes, it is, nevertheless, particularly useful and is herein described and illustrated as employed in applying protective jacketing to waveguides used in the propagation of electromagnetic energy and, more particularly, to flexible waveguides without, however, limiting the invention to those particular purposes.

Waveguides, which are commonly employed in various types of electronic apparatus, are provided both in rigid form and in flexible form. They comprise metal tubes which, advantageously, are rectangular in cross-section. Flexible waveguides, of a character found to be highly efficient, are formed with circumferentially extending corrugations which impart flexibility enabling the waveguide to be flexed into various shapes without materially altering its cross-sectional shape, thereby avoiding any material alteration in its conductivity characteristics.

Waveguides which are flexible are employed to interconnect rigid conductors which may be misaligned or which may have other intervening apparatus which prevents direct or aligned interconnection between the rigid conductors. Hence, flexible waveguides are sometimes very irregular in shape.

Flexible waveguides, also, are usually provided with outer protective jacketing of relatively soft rubber or rubber-like material which adheres to and may flex readily with the metal conducting tube. Despite the fact that such jacketing necessarily is flexible, it is, nevertheless, considered highly desirable to have it so formed that excessive flexing thereof is avoided in use. Thus, although jacketed, straight, flexible waveguides may be bent to very irregular shapes, such practices are preferably avoided as the jacketing would then, objectionably, be in a highly stressed condition when the waveguide is in use.

It is preferred that the flexible waveguide be made by first bending the metal conducting tubing approximately to the shape in which it is to be used and then applying the protective jacketing, so that the waveguide including its jacketing need undergo only little flexing upon installation. This presents a difficult jacketing problem because, in the common practice of molding jacketing onto waveguides, there are limits on the shapes of molds which can be employed. The shapes must be simple enough to provide easy and proper locating of a conducting tube in the mold and to permit easy removal of a jacketed tube from the mold without damage. These limitations foreclose molding of jacketing onto waveguide tubes of some shapes. Thus, the problem is to provide practical means, other than molding, for applying jacketing to flexible waveguides. This problem is accentuated by the fact that although the metal conducting tube is corrugated, the finished jacketing thereon should preferably be quite smooth.

The principal object of this invention is the provision of an improved method of applying protective jacketing to such metal tubes to obviate the mentioned difficulties; and, more particularly, for applying jacketing in unstressed condition in the desired irregular shape of the tube.

These and other more or less obvious objects are derived from the practice of the present invention according to operational sequences which are described herein and substantially illustrated more or less diagrammatically in the accompanying drawings as applied to the making of a flexible waveguide, without, however, limiting the invention to the making of that particular product.

In the drawings:

Figure 1 is a side elevational view of a straight, flexible waveguide without its customary jacketing.

Fig. 2 is a side elevational view of the waveguide, bent approximately to its desired final shape, although it should be noted that the desired final shape, in many instances, may be much more complex than the shape shown.

Fig. 3 is a side elevational view of the waveguide after application thereto of masking material upon parts not to be jacketed.

Fig. 4 is a side elevational view showing one of various possible ways of applying priming material to the waveguide parts to be jacketed.

Fig. 5 is a side elevational view of the waveguide after application of the priming material thereto.

Fig. 6 is a side elevational view of the primed waveguide in a simple jig for holding the waveguide in a desired configuration during subsequent steps of the process.

Fig. 7 is a side elevational view of an oven, partly broken away to show therein, in side elevation, a primed waveguide held in shape by a jig such as is shown in Fig. 6.

Fig. 8 is a side elevational view of the jig and primed waveguide immediately after removal from the mentioned oven and with electric connections at opposite ends of the waveguide for passing therethrough an electric current of suitable characteristics for maintaining a desired degree of heat in the tubular part of the waveguide.

Fig. 9 is a vertical sectional view of a tank and, in side elevation, the structures of Fig. 8 immersed in a bath, contained in said tank, of suitable jacketing material in fluid form.

Fig. 10 is a view, very similar to Fig. 8, but illustrating one of several ways of smoothing a first coat of jacketing material, although it may be noted that this smoothing may be done while the waveguide is still in the mentioned bath.

Fig. 11 is a view, very similar to Fig. 9, showing the waveguide again or still in the bath, acquiring a further or accumulated coating of the jacketing material.

Fig. 12 is a side elevational view of the jacketed waveguide after removal from the tank and jig.

Fig. 13 is a side elevational view of the jacketed waveguide, illustrating the use of a knife to cut away the masking material and to trim off any excess deposits of the jacketing material; and Fig. 14 is a side elevational view of a finished, jacketed waveguide of irregular shape.

In a preferred manner of practicing this invention, a straight, flexible, unjacketed waveguide 20 (Fig. 1), comprising a flexible tube 22, of a cross-sectional shape which is not shown but usually is rectangular, and end connection flanges 24 fixed to said tube, as by welding or soldering, is bent to the approximate shape in which it is to be used in electronic apparatus. The shape, for example, may be as shown in the several figures other than Fig. 1, although, obviously, the waveguide may be made in many other and more complex shapes. Then the end faces and marginal portions of the flanges 24 which are not to be covered by jacketing material are masked by any suitable masking tape or other masking material 26 (Fig. 3), this material being so applied as to cover, also, the end openings of the tube 22 which extend through the flanges 24. In larger sizes of waveguides, a temporary cover plate, not shown, may be used to block off the said end openings.

Thereafter, a suitable, preferably liquid primer 28 may be applied to the tube 22 and to adjacent unmasked portions of the flanges 24 by means of a spraying device of which a spray nozzle 30 is shown in Fig. 4; or the primer may be applied by a brush, not shown, or by other suitable applying means.

An essential characteristic of the primer is that it must be such as to promote an effective bond between the unmasked outer surfaces of the metal parts of the waveguide and the material which is employed as jacketing. Thus, the liquid primer should include constituents of which at least one is capable of good adhesion to metal and at least one is capable of good adhesion to the jacketing material to be used, or the primer should be a chemical compound wherein two or more constituents have united chemically to impart to the compound the capacity to effect a bond between metal and the jacketing material which is to be used.

The jacketing material hereinafter described, for illustrative purposes, is a fluid substance commonly known as plastisol of which the chief constituent is polyvinylchloride. This substance is not capable of good adhesion to metal and, therefore, the primer herein suggested, for illustrative purposes, should be capable of good adhesion both to the plastisol and to metal. More particularly, the primer preferably should include polyvinylchloride as a base material and one of the numerous, generally available plasticisers which are capable of good adhesion to metal.

After the primer has been exposed to air for a sufficient time to cause it to become substantially dry, a second coat of the same primer material may be applied, although experience under given working conditions and with particular primers may indicate that such a second coat is not needed. When the one or two coats of primer have dried, the primed waveguide (Fig. 5), if of a rather complex shape from which it may depart upon further processing, is mounted in or on a suitable jig 32.

The jig 32, as shown in Fig. 6, may be a very simple wooden structure to which the waveguide may be fixed by means of end covering lugs 34 which are suitably fastened upon and cover and close the opposite ends of the waveguide. These lugs, in turn, are suitably fixed upon inner surfaces of angularly disposed wooden bottom and end boards 36, 38 which are held together by a corner brace or cleat 40.

If a jig is to be used, the masking material at opposite ends of the waveguide may be removed after the primer coat or coats have dried, and if electrical current is to be employed as hereinafter described, at least a portion of the masking material 26 must be removed to permit establishment of electrical connections at opposite ends of the waveguide. If electrical current is not to be used, the masking material may be left on the waveguide until a later step in operations as hereinafter set forth. In any event, either the lugs 34 or a suitable plate or the masking material must be left on the waveguide to close the ends thereof during further processing hereinafter described.

The shape of the waveguide as shown in all figures excepting Fig. 1 is such that the jacketing of the waveguide may be accomplished under this invention either with or without the use of the jig 32; therefore, it should be understood that the description herein of certain steps in which the waveguide is shown and described as being associated with the jig should be read as indicating that the same steps may also be followed, within the invention, without using the jig.

The jig-waveguide assembly, after air drying of the waveguide, is heated, as, for example, by baking in an oven 42 (Fig. 7) sufficiently to thoroughly dry the primer 28 and to thoroughly heat the waveguide, preferably to a temperature of approximately 325° F. Then, upon removal from the oven or other heating medium, wires 44, 46 of a relatively high amperage electric circuit are quickly clipped to or otherwise attached to opposite ends of the waveguide to bring the latter into said circuit as shown in Fig. 8; after which the jig-waveguide assembly is quickly immersed in a bath 48 of fluid jacketing material, approximately at normal room temperature, contained in a tank 50 as shown in Fig. 9. Although various compounds are available for the said bath, one that has been found to be satisfactory is commonly known as plastisol of which the chief constituent is finely powdered polyvinylchloride (colloquially known as "PVC") dispersed in any one of several generally available plasticisers.

The resulting jacketing compound should be one which retains its flexibility and the capacity to operate continuously over the entire range of temperatures under which the waveguide may be used and, therefore, the plasticiser selected for use in the jacketing compound should be one which brings about fulfillment of these requirements. As flexible waveguides preferably should remain flexible and continuously operable at temperatures ranging from about —55° C. to about 100° C., the plasticiser selected should be one which gives the jacketing compound the capacity to flex and function satisfactorily within the limits just stated.

The mentioned electric circuit may be of approximately 50 amperes where the tube 22 is approximately 1 inch by ½ inch in transverse dimensions, and may be of greater or lesser amperage for tubes of other sizes. Such oven and electrical heating means, when employed in conjunction with the use of the specified jacketing material, serve to induce adherence of such material to the waveguide, so that during immersion, while subject to such electrical heating means, a progressively thickening coating accumulates upon the waveguide.

Upon accumulation of an initial coating of the jacketing material on the waveguide, the jig-waveguide assembly may be removed from the bath 48 and the surface of the accumulated coating may be rubbed as with a swab 52 as shown in Fig. 10, or by the operator's fingers, or by other suitable means, to eliminate air bubbles which may at that time be entrapped within the convolutions of the tube 22. This rubbing may be done, if desired, without removing the jig-waveguide assembly from the bath 48.

After such rubbing of the initial coat of jacketing material, the jig-waveguide assembly is again placed in the bath 48 (if it had been removed therefrom for the rubbing operation) and a further coating permitted to accumulate thereon (Fig. 11). Generally speaking, a longer duration of immersion will yield a thicker coating, but it is preferable to limit the duration of each immersion and thereby limit the thickness of the coating.

After accumulation of a relatively thin coating of jacketing material additional to that acquired in the initial immersion, the jig-waveguide assembly is withdrawn slowly from the tank and rotated slowly, either manually or by suitable mechanical means, to insure uniformity of the coating. This rotation should be continued, while the waveguide is still within the mentioned electric circuit, until the heat generated by the electric current sets up the coating. The rotation of the jig-waveguide assembly is particularly important where the waveguide is of a complex shape as, otherwise, it is practically impossible to prevent running of fluid surface portions of the coating. If the waveguide is of a relatively simple shape, the rotation thereof may be omitted, in which event the jig-waveguide assembly is hung so that running or dripping occurs only in an area which will later be trimmed.

After the coating has set sufficiently that it will not run, the jig-waveguide assembly is preferably heated as by baking for about five minutes at approximately 325° F. Thereafter, if the jacketing is not as thick as desired, the last-mentioned immersion step and related subsequent heating and setting operations may be repeated to yield the desired thickness. If rough spots are present on the jacketing after final immersion, a suitable solvent such as methyl-ethyl-ketone may be used on a cloth to rub and smooth said spots prior to the final baking operation.

After setting of the final coating, the electrical connections 44, 46 are removed and the waveguide is removed from the jig 32, if a jig has been used, after which an operator, using a knife 54 (Fig. 13), may cut away any drip or other excess portions of the jacketing material which remains and may remove all masking material not previously removed. Then, the waveguide should be finally baked until thoroughly heated at 325° F. For waveguides of small cross-section, it has been found that a period of fifteen minutes suffices for this final baking operation. This leaves the completed, jacketed, irregular-shaped, flexible waveguide as shown in Fig. 14.

As an alternative to the described use of electricity to maintain heat in the tube 22, the mentioned electrical means may be dispensed with and the jig-waveguide assembly (or the waveguide alone), heated as aforesaid to approximately 325° F., may be merely dipped into the plastisol bath 48 and then removed and again subjected to heat at about 325° F. in an oven or other heating means for five minutes or so until the dip coating has set; the waveguide, meanwhile, being rotated in the manner and for the reasons already set forth. An oven used for this purpose may advantageously have therein a rack (not shown) which may hold the jig-waveguide assembly (or the waveguide alone) and which may be driven to rotate the assembly about plural axes by suitable driving means; or such rotating means may be employed in association with infra-red heating lamps or equivalent heating means to rotate the waveguide while heat setting of the jacketing material is in progress. The waveguide may be thus heated, dipped and then reheated for setting purposes several times, according to the thickness of jacketing desired. Such baking, after final dipping, however, should preferably be of relatively long duration as, for example, a period of fifteen minutes, which ordinarily is sufficient.

It will readily be perceived that this invention provides for the application of jacketing to flexible waveguides and similar metal tubular devices in an economical and functionally satisfactory manner; eliminating the need for a multiplicity of dies for the production of such devices in the many sizes and shapes in which they are used, and permitting jacketing of such devices in very irregular shapes in the production of which it would be difficult and, in many cases, impossible to use dies for molding a jacket onto the device.

Only several of numerous possible variations have been herein suggested in relation to the present invention, and it should be understood that the inventive concept may be employed, also, in other variations, without departing from the invention as set forth in the following claims.

We claim:

1. A process for making a jacketed, flexible, metal tube which, in an intermediate position of its expected range of flexing, is so bent as to make it impractical to apply jacketing thereto by molding, and wherein the jacketing is in substantially non-flexed condition when the tube is in such intermediate position; said process comprising bending a flexible, metal tube to said intermediate position and applying, to said tube, priming material capable of good adhesion to the metal of said tube and including polyvinylchloride as a constituent thereof and permitting said applied priming material to at least partially set; heating the primed tube and immersing the heated tube in a bath of jacketing material comprising polyvinylchloride and a plasticiser which, when solidified and cured, is flexible and retentive of its flexibility throughout a relatively wide temperature range, and then removing the tube from the bath and again heating it to completely set the adherent jacketing material; the said bending of the tube to said intermediate position and the mentioned application of the priming material to the tube each being performed at some point in the process prior to the mentioned immersion; and the degree of heat established in the tube in the two mentioned heating steps being approximately that at which the jacketing material reacts to become solidified and cured.

2. A method according to claim 1, wherein the bent tube is associated with a jig during the mentioned heating and immersion steps to hold it in said intermediate position.

References Cited in the file of this patent

UNITED STATES PATENTS

| | | |
|---|---|---|
| 1,581,401 | Mueller | Apr. 20, 1926 |
| 2,307,861 | Shapiro | Jan. 12, 1945 |
| 2,550,232 | Donnell et al. | Apr. 24, 1951 |
| 2,594,096 | Trigg | Apr. 22, 1952 |